(12) United States Patent
Srinivasan et al.

(10) Patent No.: US 6,808,608 B2
(45) Date of Patent: Oct. 26, 2004

(54) WATER PURIFIER AND METHOD

(75) Inventors: Kannan Srinivasan, Sunnyvale, CA (US); Nebojsa Avdalovic, Cupertino, CA (US)

(73) Assignee: Dionex Corporation, Sunnyvale, CA (US)

( * ) Notice: Subject to any disclaimer, the term of this patent is extended or adjusted under 35 U.S.C. 154(b) by 355 days.

(21) Appl. No.: 10/099,854

(22) Filed: Mar. 13, 2002

(65) Prior Publication Data

US 2003/0173222 A1 Sep. 18, 2003

(51) Int. Cl.[7] .......................... C02F 1/469; B01D 61/48
(52) U.S. Cl. ...................... 204/533; 204/524; 204/536; 204/632; 204/633; 210/659; 210/900
(58) Field of Search ................... 204/524, 533, 204/536, 632, 633; 210/659, 900

(56) References Cited

U.S. PATENT DOCUMENTS

| | | | |
|---|---|---|---|
| 2,689,826 A | 9/1954 | Kollsman | |
| 2,794,777 A | 6/1957 | Pearson | |
| 2,815,320 A | 12/1957 | Kollsman | |
| 2,923,674 A | 2/1960 | Kressman | |
| 3,149,061 A | 9/1964 | Parsi | |
| 3,341,441 A | 9/1967 | Giuffrida | |
| 3,869,376 A | 3/1975 | Tejeda | |
| 4,148,708 A | 4/1979 | Grant | |
| 4,632,745 A | 12/1986 | Giuffrida et al. | |
| 4,925,541 A | 5/1990 | Giuffrida et al. | |
| 4,931,160 A | 6/1990 | Giuffrida | |
| 4,956,071 A | 9/1990 | Giuffrida et al. | |
| 4,999,098 A | 3/1991 | Pohl et al. | |
| 5,154,809 A | 10/1992 | Oren et al. | |
| 5,308,466 A | 5/1994 | Ganzi et al. | |
| 5,308,467 A | 5/1994 | Sugo et al. | |
| 5,352,360 A | 10/1994 | Stillian et al. | |
| 5,736,023 A | 4/1998 | Gallagher et al. | |
| 5,868,915 A | 2/1999 | Ganzi et al. | |
| 6,077,434 A | 6/2000 | Srinivasan et al. | |
| 6,117,297 A | 9/2000 | Goldstein | |
| 6,126,805 A | 10/2000 | Batchelder et al. | |
| 6,241,866 B1 | 6/2001 | Mir | |
| 6,241,867 B1 | 6/2001 | Mir | |
| 6,254,753 B1 | 7/2001 | Mir | |
| 6,312,577 B1 | 11/2001 | Ganzi et al. | |
| 6,328,885 B1 | 12/2001 | Srinivasan et al. | |
| 6,649,037 B2 * | 11/2003 | Liang et al. | 204/632 |

FOREIGN PATENT DOCUMENTS

| | | |
|---|---|---|
| DE | 41 35 166 A1 | 5/1992 |
| DE | 197 13 977 A1 | 10/1997 |
| EP | 0 867 224 A2 | 9/1998 |

* cited by examiner

*Primary Examiner*—Arun S. Phasge
(74) *Attorney, Agent, or Firm*—David J. Brezner; Dorsey & Whitney LLP

(57) ABSTRACT

An apparatus for removing charged contaminants from a water stream. The apparatus can be figured to provide the decontaminated water stream to an analytical system. Methods of use of the same are also disclosed.

35 Claims, 12 Drawing Sheets

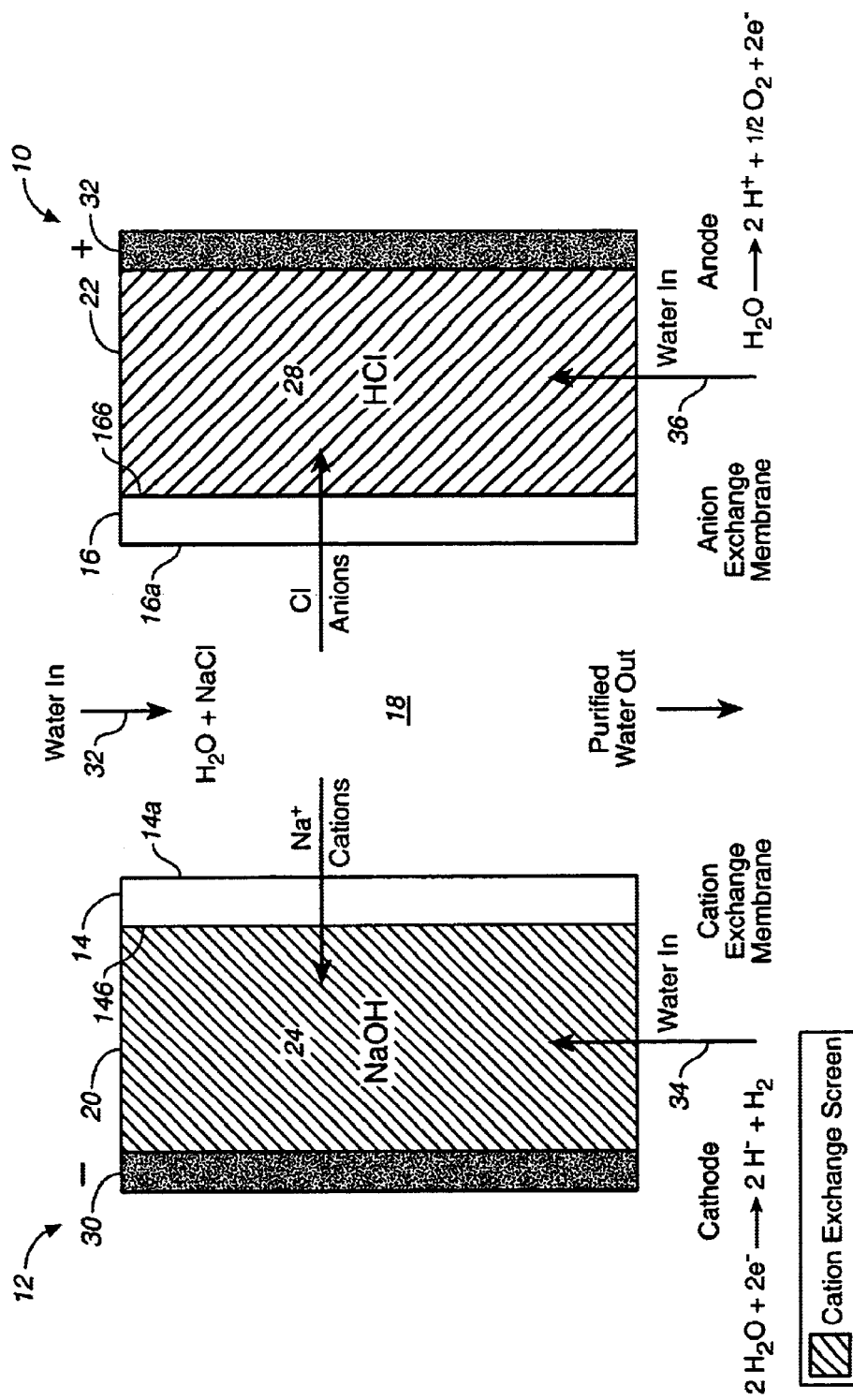
FIG._1

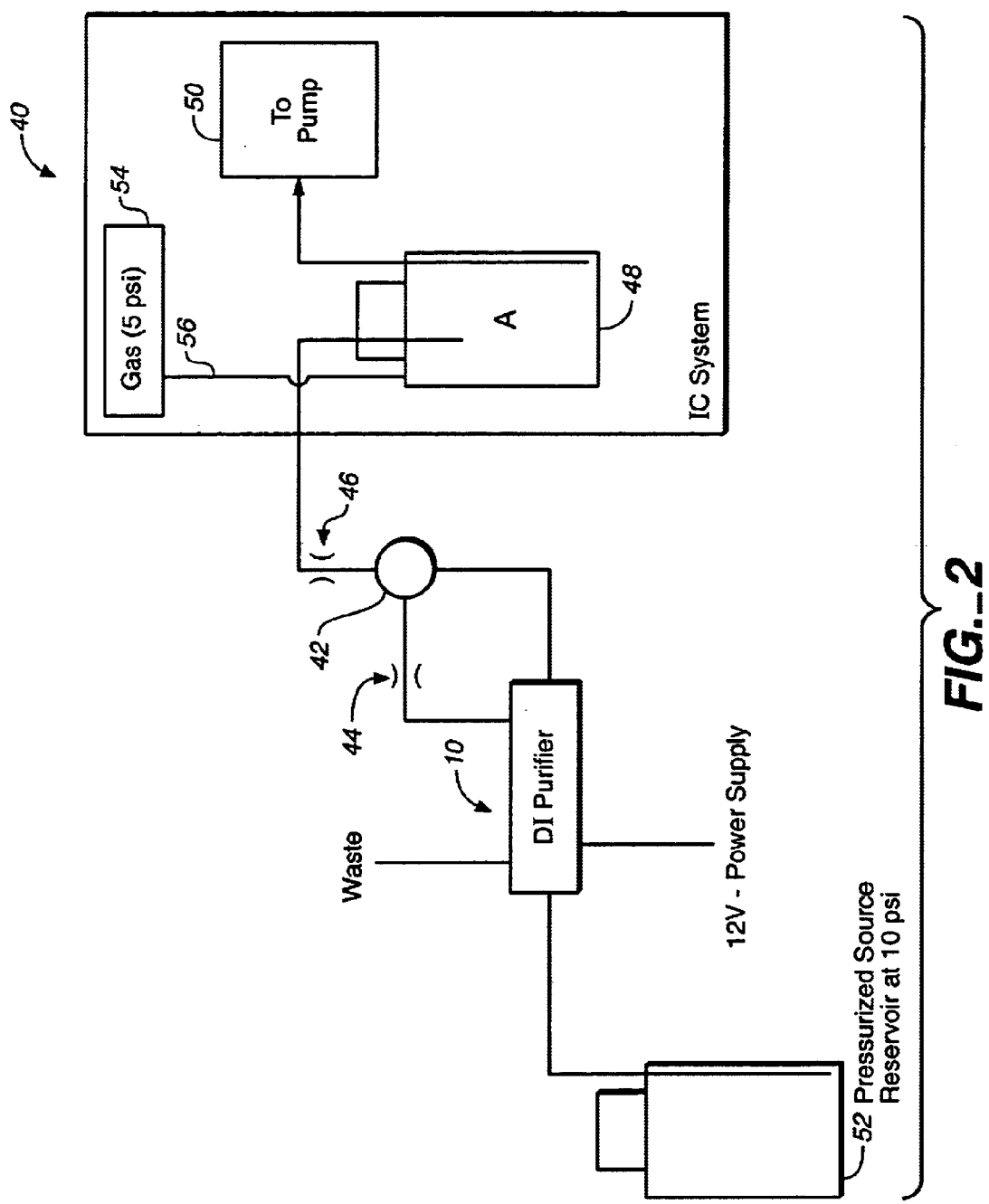
FIG._2

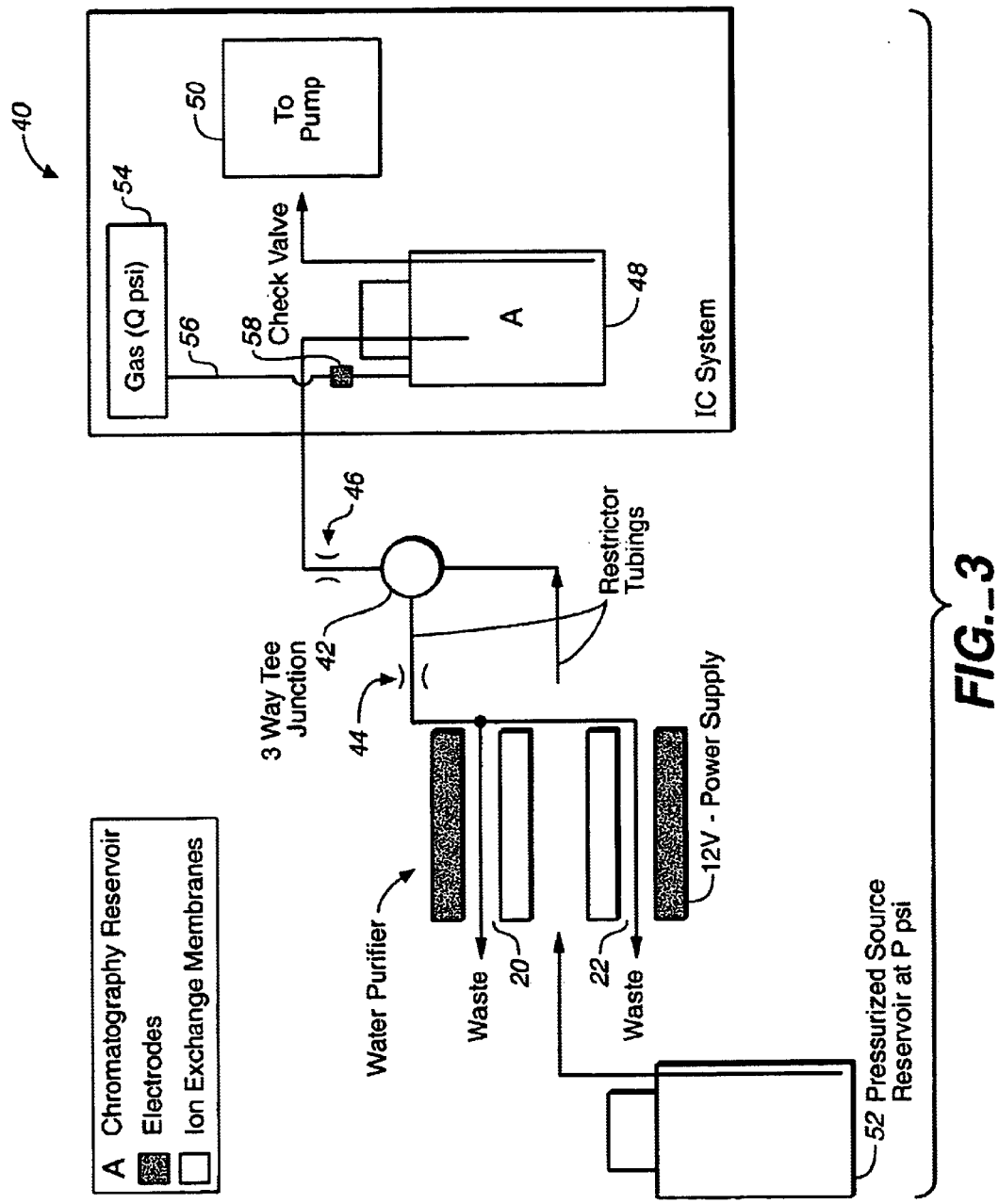
FIG._3

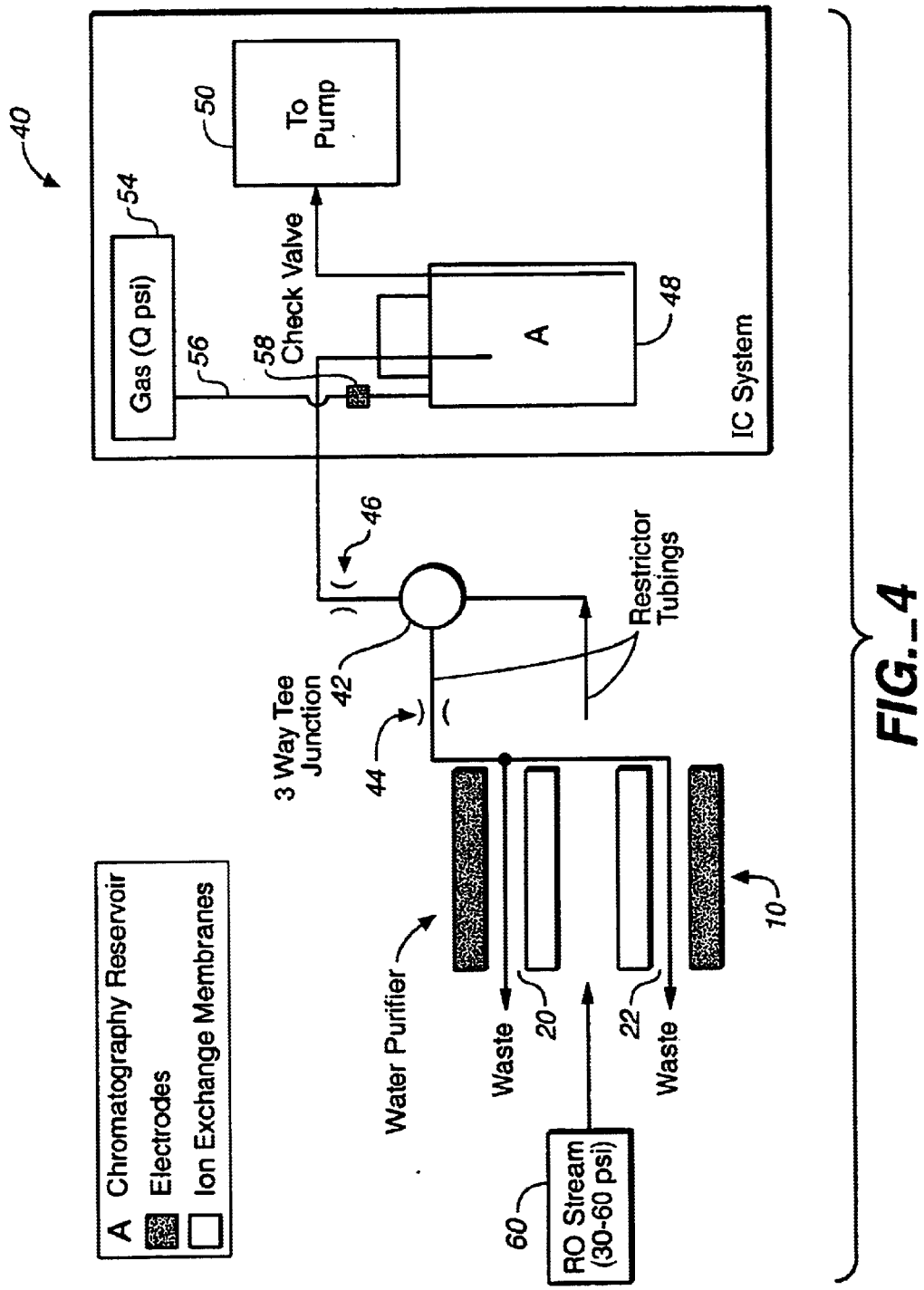
FIG._4

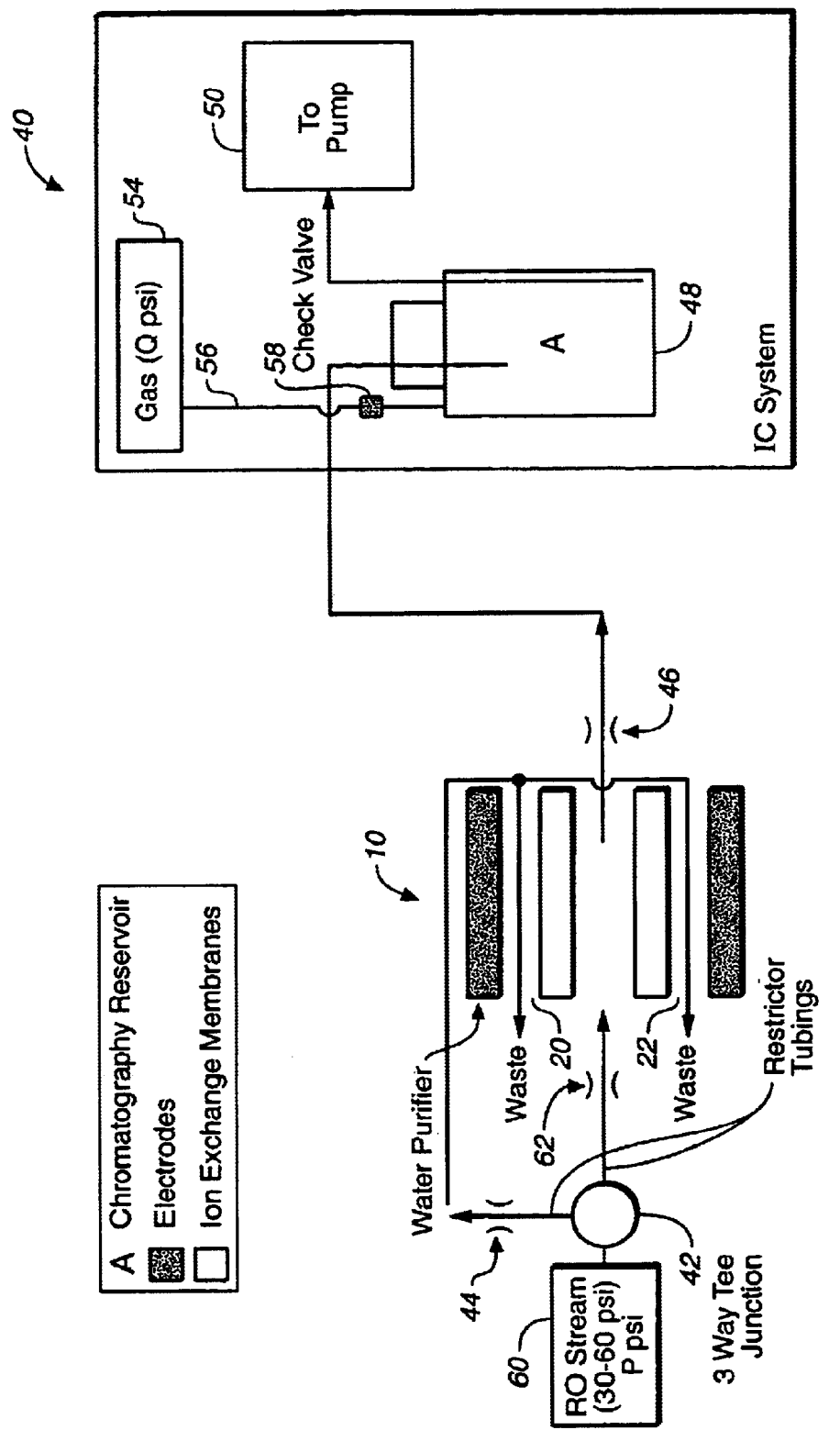
FIG._5

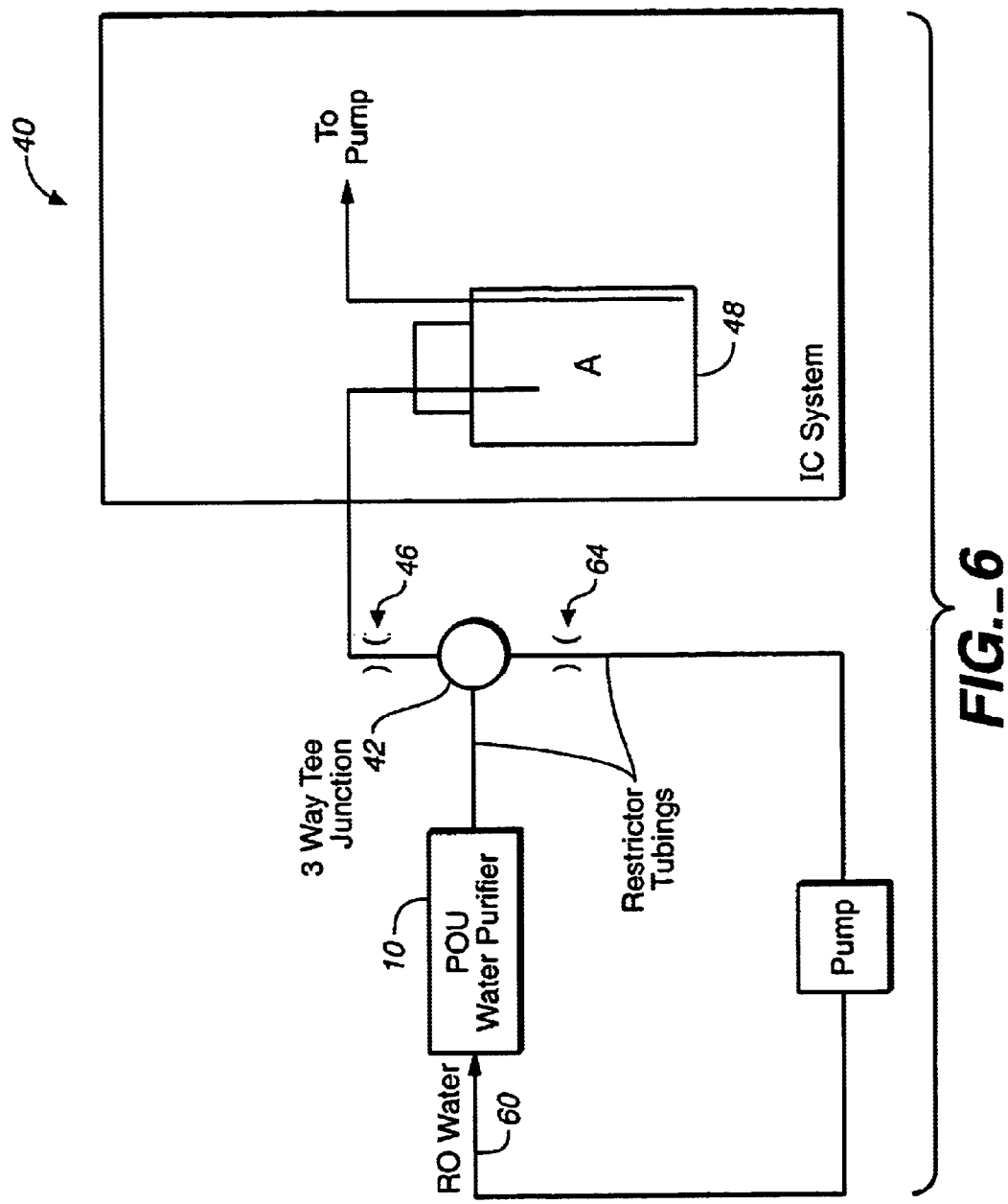
FIG._6

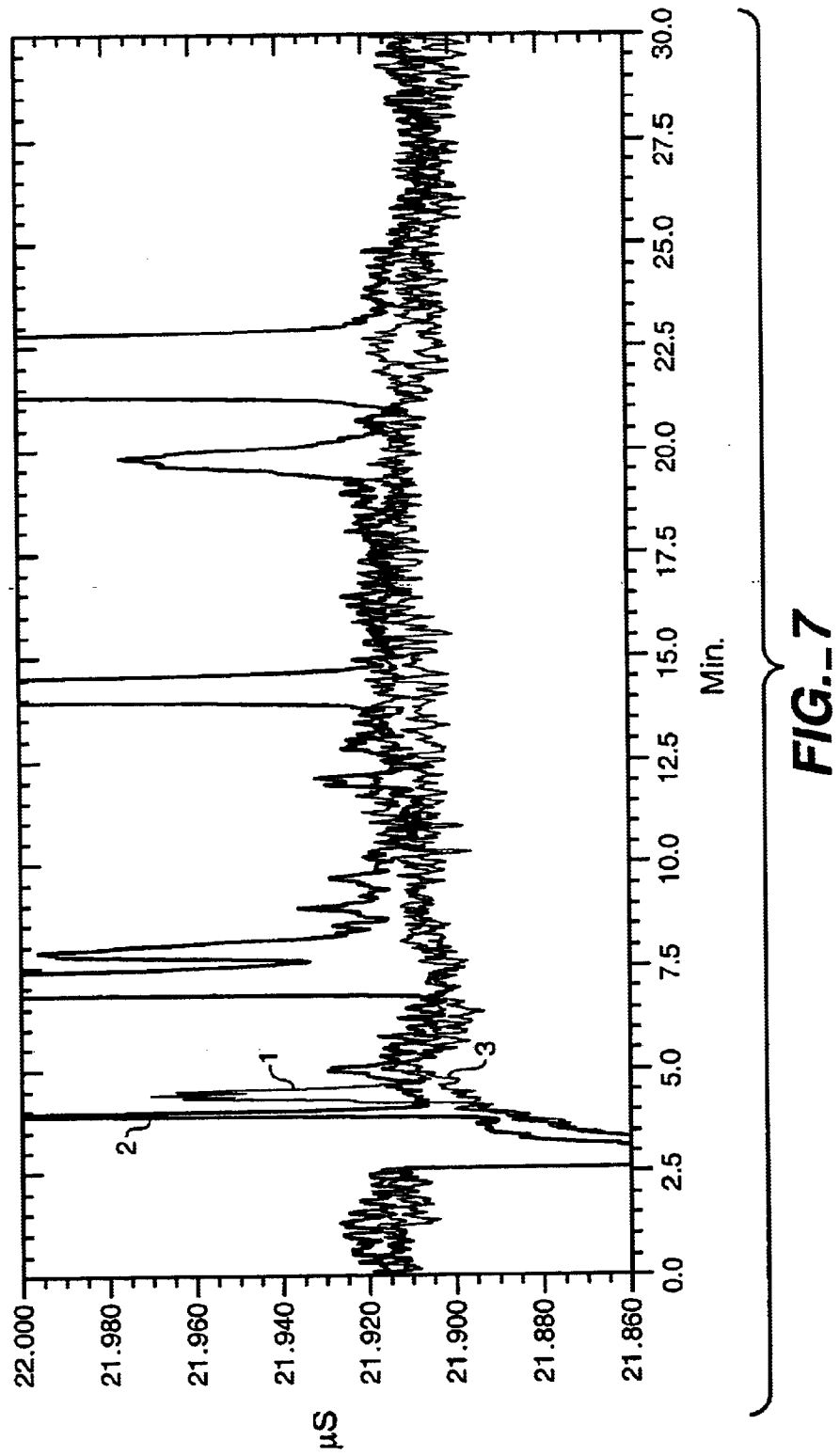
FIG._7

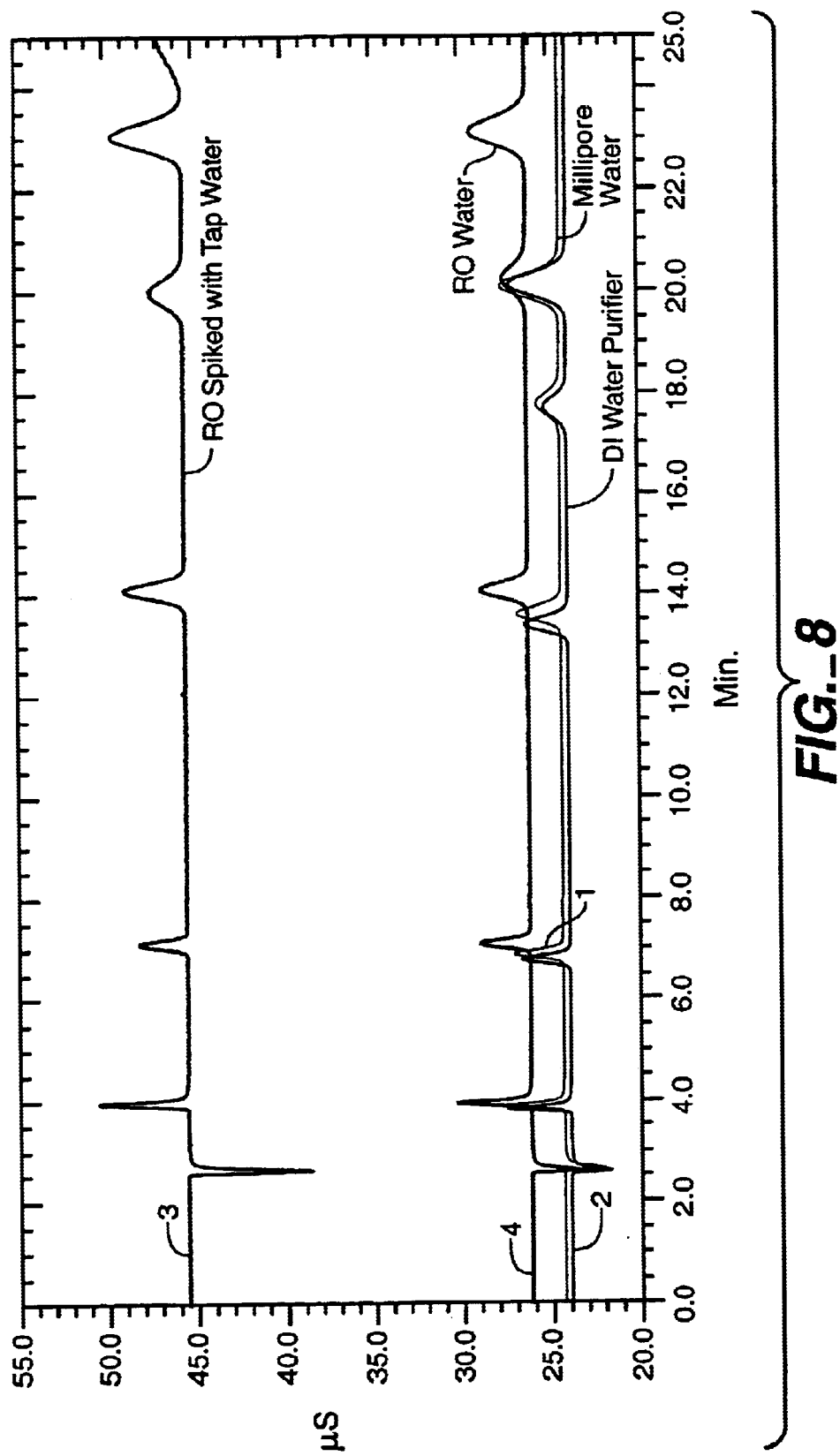
FIG._8

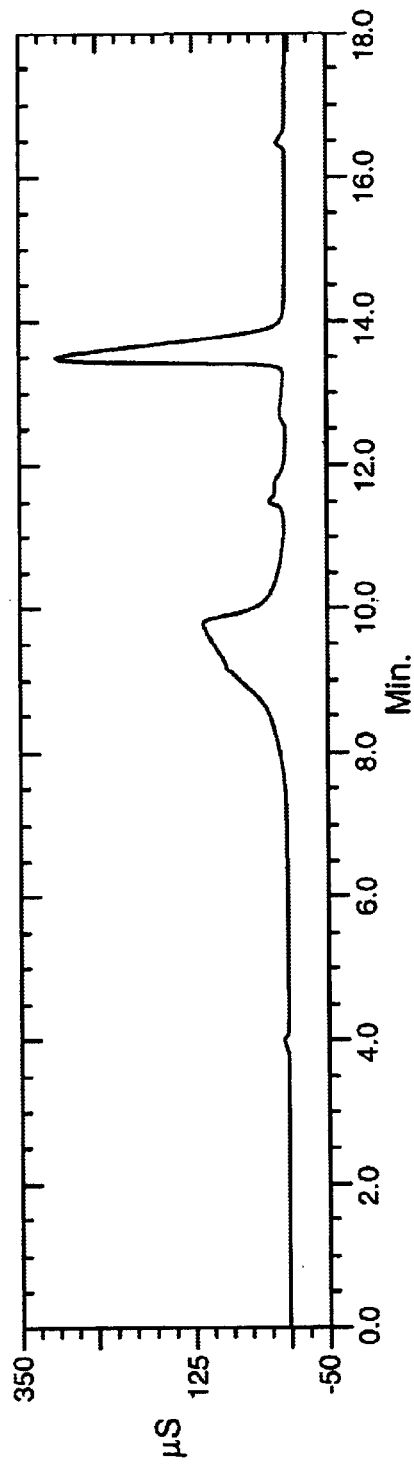
FIG._9a
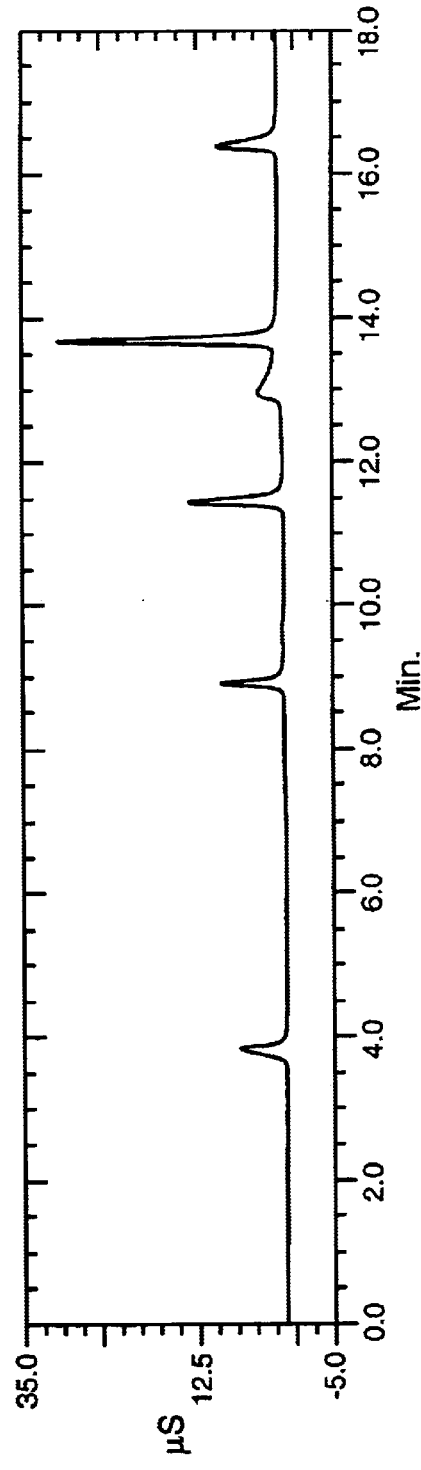
FIG._9b

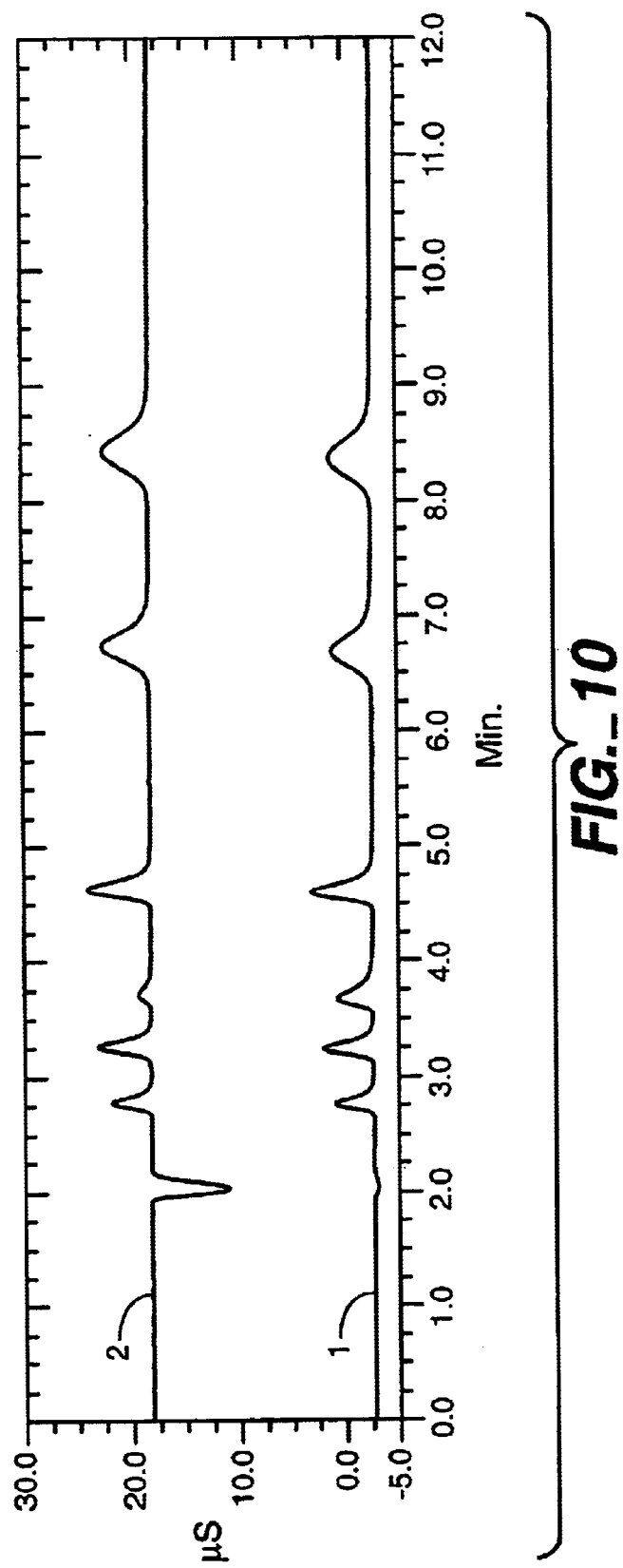
FIG._10

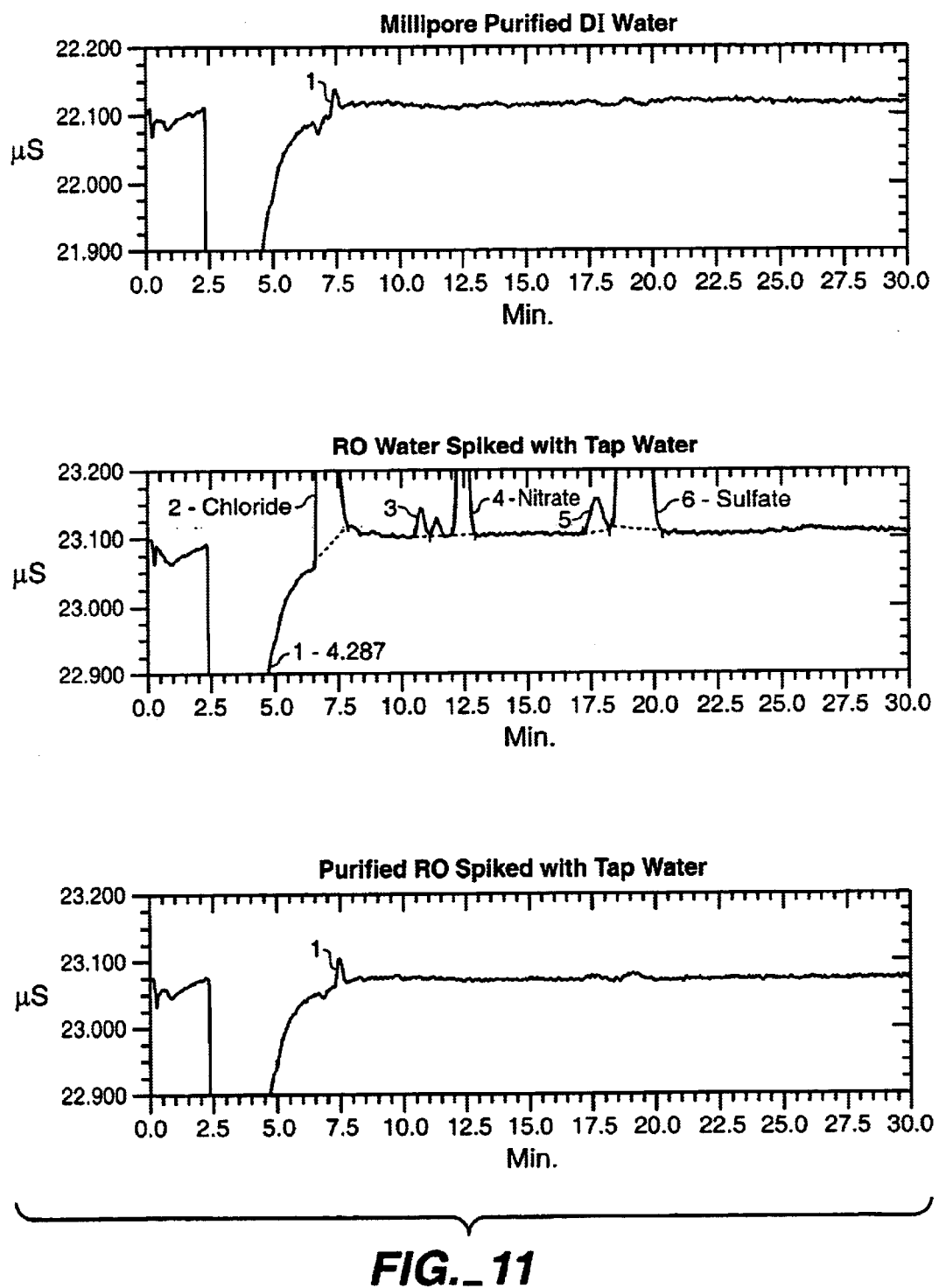
FIG._11

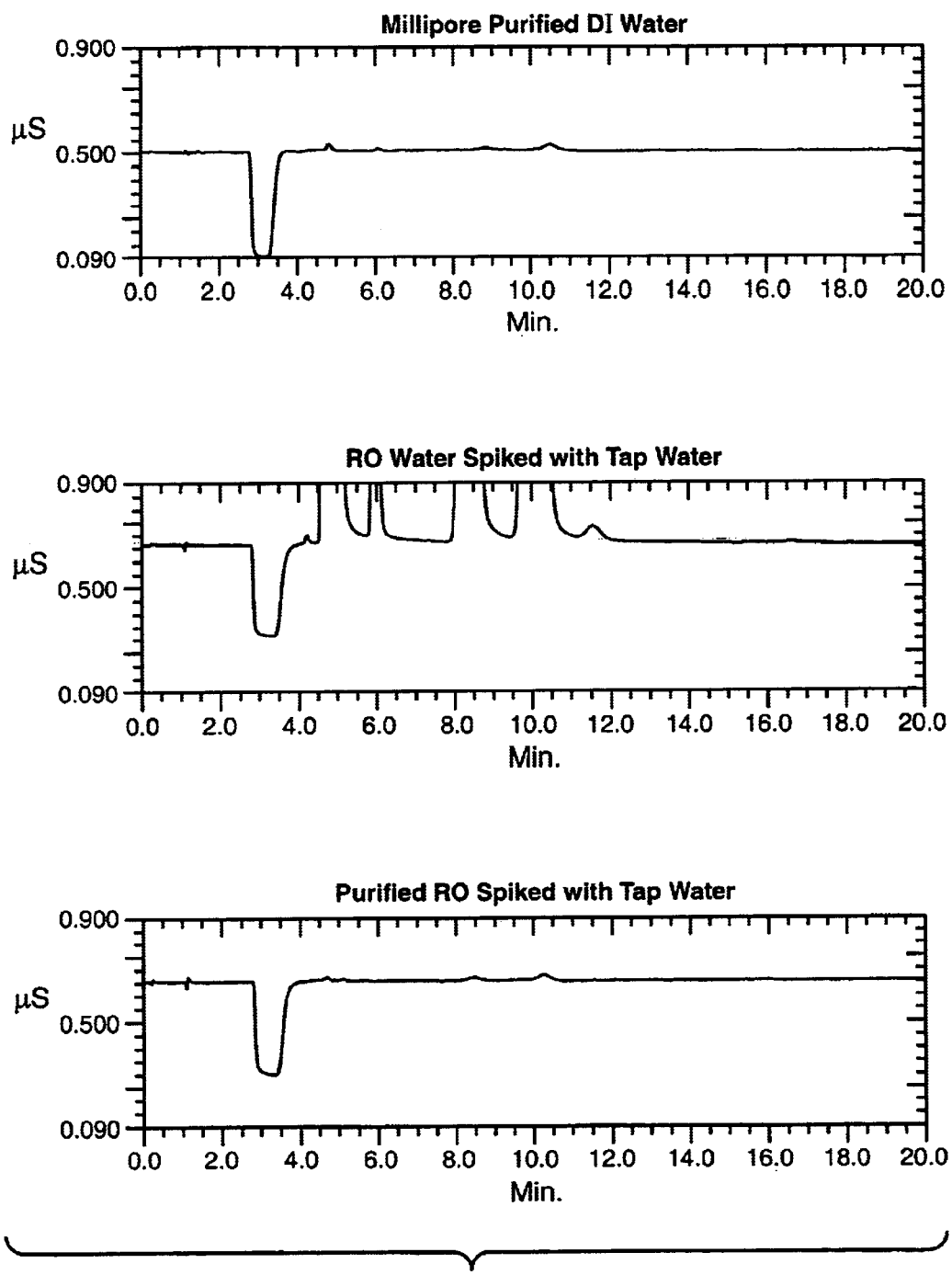
FIG._12

WATER PURIFIER AND METHOD

BACKGROUND OF THE INVENTION

The invention relates to method and apparatus for purifying water, particularly in a current efficient manner.

Purified deionized (DI) water is used in a number of analytical applications such as in chromatography and in ion chromatography for making online or offline eluents, in sample preparation applications using auto samplers and in a variety of day to day laboratory uses. Many electrodialytic methods have been used to produce purify DI water.

Electrodialysis as described in the literature is a term used when a cation exchange membrane and an anion exchange membrane are used in conjunction with an electric field for purification of tap water, salt water or brackish water. "Electrodeionization" is the term used to describe the use of ion exchange materials in the above approach. A number of patents discuss the above approaches with various ion exchange materials and configurations.

An early apparatus and method for treating liquids by electrodialysis was shown by Kollsman in U.S. Pat. No. 2,689,826. This device contained anion and cation exchange diaphragms that are arranged in series with electrodes flanking the end of the device. One volume of liquid to be treated is placed in a depletion (purifying) chamber and the ions migrate over time from this volume into a second volume of liquid in the concentration chamber. Thus, the treated liquid is depleted of ions and the liquid in the concentration chamber is enriched with the transferred ions. U.S. Pat. No. 2,794,777 disclosed devices of similar construction with acid and base solutions flowing in the chamber adjacent to the anion and cation diaphragm, respectively. The function of the acid and base solution was to provide a conductive pathway and, thus, lower resistance. The anion and cation exchange diaphragms were walls made with cloth and packed with the respective resin materials. Partial ionization was accomplished with this device in combination with other packed bed columns.

U.S. Pat. No. 2,815,320 disclosed devices that use macroporous ion exchange beads as a filler between permselective anion and cation exchange membranes to lower the resistance and maintain a conductive pathway. There is a suggestion that electrolytes could be circulated in the electrode chambers. According to this patent, the electrolyte in the electrode chambers, and the conductive filler in the intermediate chambers provided a conductive path for current transport. U.S. Pat. No. 2,923,674 disclosed similar electrodialysis devices with multiple anion and cation exchange treatment chambers that facilitate removal of ions and hence purification of a water stream. The above devices also used acid electrolytes in certain chambers.

U.S. Pat. No. 3,149,061 disclosed devices that were useful for removal of both strongly and weakly ionized species from aqueous solutions. The dilution (purifying) chambers in the above devices were either filled with a mixture of cation and anion exchange resins or anion exchange resin by itself. U.S. Pat. No. 3,341,441 disclosed an electrodialytic process where the applied polarity was reversed periodically to minimize scale buildup in the electrode chambers.

U.S. Pat. No. 3,869,376 disclosed devices that were useful for demineralizing soft water. The treatment chamber in these devices were packed with ion exchange resins.

U.S. Pat. No. 4,148,708 disclosed electrodialytic cells that were packed with mixed anion and cation exchange resin in the feed compartment while packing the anode and the cathode compartments with anion exchange and cation exchange resin, respectively. This cell was useful for generating acid, a base and purifier water from the three chambers.

U.S. Pat. No. 4,632,745 disclosed an electrodeionization apparatus with depleting chambers packed with mixed anion and cation exchange resins while the concentration chamber was free of ion exchange resins. Similarly, U.S. Pat. No. 4,925,541 disclosed electrodeionization apparatus with the depletion chambers filled with anion and cation exchange resin beads while the concentration compartments are free of ion exchange beads. The beads in the depleting compartments were housed within subcompartments of controlled width and thickness and were retained therein by ion permeable membranes, which were secured to the wall of the subcompartments. Another version of the above device was shown in U.S. Pat. No. 4,931,160 in which the liquid to be purified was passed through at least two ion depletion compartments filled with anion and cation exchange resin beads. U.S. Pat. No. 4,956,071 disclosed electrodeionization devices that have both the depletion chambers and the concentration chambers filled with ion exchange resin beads. This patent discloses means for reversing the applied polarity and means of recovering a purified product continuously. U.S. Pat. No. 5,154,809 disclosed electrodeionization devices with depletion chambers and possibly concentration chambers filled with mixed ion exchange beads of uniform size.

U.S. Pat. No. 5,308,466 disclosed devices with at least one section of the device having ion exchange membranes/resins of lower crosslinking and lower selectivity, thus reducing the electrical resistance and facilitating removal of large, heavily hydrated, highly or weakly charged molecules (such as silica) from the feed water. U.S. Pat. No. 5,308,467 disclosed electrodeionizers with a radiation grated polymer with mixed ion exchange moieties (anion and cation exchange) as a packing in the demineralizing or dilution compartment.

U.S. Pat. No. 5,736,023 disclosed an electrodeionization apparatus having ion exchange resins in both the depletion and concentration chambers. The apparatus has a polarity reversal means and a means of substituting the fluid in the ion-concentrating compartment with a fluid of lower ionic concentration while maintaining flow in the ion-depleting compartment. U.S. Pat. No. 5,868,915 disclosed electrodeionization apparatus with electroactive media in the depletion and concentration compartments. There are several other patents that disclose improvements to the electrodeionization apparatus and process, such as U.S. Pat. Nos. 6,117, 927, 6,126,805, 6,254,753, 6,241,866, 6,241,867 and 6,312, 577.

All of the above-disclosed devices are current inefficient devices that require an excess current than predicted from theory for the deionization process. Devices with mixed ion exchange packing materials in the depletion chamber split water and hence are current inefficient.

U.S. Pat. Nos. 6,077,434 and 6,328,885 disclosed means of improving current efficiency for suppressor and suppressor like devices in ion chromatography. The devices disclosed for anion analysis remove cations and convert the matrix ions to a nonconductive form while converting all anion species to conductive acids.

In ion chromatography, the presence of ionic impurities in the water can affect peak response and sensitivity, linearity of response, background stability and baseline noise. The life time of consumables, such as columns and suppressors may also suffer due to the presence of contaminants.

Some of the issues with contaminants in the eluents or reagents may be addressed by using ultra high purity reagents with certified level of contaminants. Analytical laboratories have point of use polisher systems that are intended to lower the level of ionic contaminants in the DI water. With these systems, however, replacing the polisher is not mandated. The detection of water quality on most systems is also not reliable. Use of certified bottled water for eluent or reagent preparation is another approach. This approach, however, suffers from the limitation of contamination from the environment, handling issues, shelf life and added costs. Additionally, it is difficult to eliminate certain contaminants such as carbon dioxide and ammonia, during the reagent preparation process.

The net effect of the above-discussed factors is variability in the water quality from one laboratory to another laboratory. Therefore, it is desirable to have a way to purify DI water online, e.g., for chromatographic systems.

In prior art literature related to electrodialysis and electrodeionization, the current required for purification is derived empirically and typically the applied current is in excess of what is required for purification. This excess current is detrimental as it increases the heat generated by the device or process and the device lifetime suffers due to the excess heat. Therefore, there is a need for a current efficient deionizer device that could self-regulate the current required for the function of purification.

Commercial laboratory water purifiers, such as the devices discussed above, normally operate at very high flow rates in comparison to chromatographic systems. Typically commercial laboratory water purifiers are operated at LPM flow rates, whereas chromatographic systems are operated at ml/min flow rates. Additionally the variance in flow rate is much higher for laboratory water purifiers in comparison to chromatographic systems. This mismatch in flow characteristic results in difficulty in interfacing the two systems.

In normal chromatographic operation water is mixed with eluent and/or solvent using a proportioning valve. Typically, chromatography users fill and replenish the water offline using commercial laboratory water purifier systems. This setup requires frequent monitoring and replenishing of the water purifier and can be quite cumbersome. Due to the high flow rates and pressures of the water stream from commercial laboratory purifiers, it is difficult to directly interface the water stream of the purifier systems to a reservoir of a chromatographic system. One way to resolve this would be to use a sensor that would trigger the purifier to turn off the flow at a given time or in response to some property such as level of liquid in the chromatographic system reservoir. The above approach however is not very practical since most commercial water purifiers begin with a high level of contaminants on starting the purifier and diverting this contaminated water to the chromatographic system reservoir is not acceptable.

In ion chromatographic analysis with a eluent generator module, for example, with module EG40 sold by Dionex Corporation, a pump is fed on the low pressure side with DI water. Eluent is then generated using this module on the high pressure side of the pump. In this mode it would be desirable to feed the pump directly with a stream of DI water. With commercial water purifiers, a direct interface is not possible due to the higher flow rate issue and the issue with contaminants as discussed above. Furthermore, it is very expensive to leave the purifier on all the time. Therefore there is a need for a simple means of connecting commercial water purifiers to an analytical system, such as a chromatographic system or an auto sampler. In particular there is a need for directly interfacing electrodeionizers to chromatographic systems.

SUMMARY OF THE INVENTION

In accordance with the present invention, methods and apparatus are provided for removing charged contaminants from a water stream, particularly in a current efficient manner.

Also in accordance with the present invention, methods and apparatus are provided for interfacing a water purifier to an analytical system in a convenient manner.

In one embodiment, the apparatus for removing charged contaminants from a water stream comprises: (a) a first cation exchange membrane with exchangeable cations and a first anion exchange membrane with exchangeable anions both having inner and outer walls, the inner walls of the first cation and anion membranes defining a first purifyng flow channel therebetween, the first cation and anion exchange membranes preventing bulk liquid flow but passing ions of the same charge as the corresponding exchangeable ions (b) a first cation chamber defining a first cation flow channel on the outer wall side of the first cation exchange membrane, (c) a first anion chamber defining a first anion flow channel on the outer wall side of the first anion exchange membrane, (d) a cathode and an anode in electrical communication with the first cation flow channel and the first anion flow channel, respectively, (e) flow-through first ion exchange medium disposed in the first. cation flow channel, (f) flow-through second ion exchange medium disposed in the first anion flow channel and (g) a zone within and coextensive with the length of the first purifying flow channel free of flow-through ion exchange medium or having flow-through ion exchange medium with an ion exchange capacity no greater than 25% of the first and second ion exchange media.

In another embodiment, a method is provided, which may use the foregoing apparatus, in which a water stream is purified by removing contaminants therefrom comprising the steps of: (a) flowing the water stream through a purifying flow channel defined by a cation exchange membrane with exchangeable cations disposed along one side of the purifying flow channel and an anion exchange membrane with exchangeable anions disposed along the other side of the purifying flow channel, the anion and cation exchange membranes preventing bulk liquid flow but passing ions of the same charge as the corresponding exchangeable ions, a zone within and coextensive with the length of the purifying flow channel free of flow-through ion exchange medium or having flow-through ion exchange medium with an ion exchange capacity no greater than 25% of the first and second ion exchange media, (b) flowing an aqueous stream through first ion exchange medium in a cation flow channel on the opposite side of the cation exchange membrane from the purifying flow channel, (c) flowing an aqueous stream through second ion exchange medium in an anion flow channel on the opposite side of the anion exchange membrane from the purifying flow channel, and (d) during steps (a), (b) and (c), applying an electrical potential between a cathode in electrical communication with the cation flow channel and an anode in electrical communication with the anion flow channel.

In a further embodiment, an apparatus for purifying an aqueous liquid stream for flowing the same to an analytical system comprises: (a) a flow-through water purifier having an inlet and an outlet, (b) a pressurized source of impure water communicating with the purifier inlet, (c) an analytical pump, (d) a first conduit disposed between the purifier outlet and the pump, (e) a liquid stream splitter having a diversion outlet, disposed between the impure water source and the purifier inlet, or between the purifier outlet and the analytical pump, the splitter splitting the liquid stream flowing to the splitter inlet into a first and second stream, and (f) a second conduit providing fluid communication between the diversion outlet and the purifier.

In yet another embodiment, a method is provided, which may use the foregoing apparatus, in which a water stream is purified and the same is provided to an analytical system. The method comprises the steps of: (a) purifying the impure aqueous stream by flowing the same from a pressurized source through a purifier having an inlet and an outlet, (b) flowing the purified aqueous stream from the purifier outlet through an analytical pump, (c) splitting the impure aqueous stream between the pressurized source and the purifier so that only part of the impure aqueous stream is purified in the purifier, or splitting the purified aqueous stream from the purifier outlet so that only part of the purified liquid stream flows through the analytical pump.

BRIEF DESCRIPTION OF THE DRAWINGS

FIGS. 1–6 are schematic representations of devices according to the invention.

FIGS. 7–12 are graphs illustrating experiments performed according to the invention.

DETAILED DESCRIPTIONS OF THE PREFERRED EMBODIMENT

The system of the present invention is particularly useful for the removal of charged contaminants from a water stream to produce a purified DI water stream suitable for use in analytical applications such as in chromatography and in ion chromatography for making online or offline eluents, in sample preparation applications using auto samplers and in a variety of day to day laboratory applications. Thus, the term a "water stream" as used herein, typically refers to a water stream with contaminants to be removed which may be used in these types of applications.

The device of the present invention would allow purification of municipal water or tap water or water partially purified using a reverse osmosis unit or partially purified by other means. The purified water from the device of the present invention may be diverted to other purification devices for further treatment for example the water may be diverted into a column for removal of organics.

The starting water stream may include ionic contaminants from low to high concentrations, e.g., from 10 ppb to 300 ppm. Typically, the starting stream is tap water and has a contaminant range of 30 ppm to 200 ppm. The water stream may be stored in an online application to provide DI water of high purity for the desired application. For example, in chromatography, typical ranges of ionic impurities are less than about 0.01 ppm.

In general terms, the purifying apparatus for removing charged contaminants from a water stream include the following components: (a) a first cation exchange membrane with exchangeable cations and a first anion exchange membrane with exchangeable anions both having inner and outer walls, the inner walls of the first cation and anion membranes defining a first purifying flow channel therebetween, the first cation and anion exchange membranes preventing bulk liquid flow but passing ions of the same charge as the corresponding exchangeable ions, (b) a first cation chamber defining a first cation flow channel on the outer wall side of the first cation exchange membrane, (c) a first anion chamber defining a first anion flow channel on the outer wall side of the first anion exchange membrane, (d) a cathode and an anode in electrical communication with the first cation flow channel and the first anion flow channel, respectively, (e) flow-through first ion exchange medium disposed in the first cation flow channel, and (f) flow-through second ion exchange medium disposed in the first anion flow channel. The first purifying flow channel includes a zone within and coextensive with the length of the channel free of flow-through ion exchange medium or has flow-through ion exchange medium with an ion exchange capacity no greater than 25% of the first and second ion exchange media As the capacity in the purifying flow channel increases the wastage current also increases. As the wastage current increases the device is no longer current efficient and higher currents are required to deionize a given stream.

The term "flow-through" refers to medium in a flow channel through which a liquid flows but excludes the membranes defining the channel.

In one embodiment, the zone comprises the purifying flow channel between the ion exchange membrane walls defining the channel.

In another embodiment, ion exchange medium such as ion exchange screens can be disposed adjacent both membrane walls. In this instance, the zone comprises a central channel separating the screens. The zone can be disposed along the purifying flow channel at any location coextensive with the length of the flow channel. Preferably, the zone is at least about 0.025 mm wide or at least 5% of the width of the purifyng flow channel.

Thus, there may be some capacity included in the purifying channel as long as there is a zone free of flow-through ion exchange medium or having flow through ion exchange medium with an ion exchange capacity of no greater than 25%, preferably 10%, more preferably 5% and most preferably 0–1%, of the first and second ion exchange media, along the entire length of the purifying channel and parallel to the membranes. This neutral or low ion exchange capacity zone prevents the free passage of current. Thus, current efficiency is maintained since the contaminant ions continue to carry bulk of the current in this zone.

In one specific embodiment, functionalized gasketed screen materials are disposed as spacers adjacent to the inner walls of the membranes. A neutral gasketed screen material may be disposed in the neutral or no capacity zone. The functionality or polarity of the functionalized spacers are preferably the same as the ion exchange membranes. In operation, the contaminant ions of appropriate charge are drawn towards the electrodes and are retained on these functionalized spacers prior to passing through the membrane. The neutral or low capacity zone ensures efficient transport of the contaminant ions from the incoming stream to the spacers and membranes.

The capacity of the functionalized spacers may be as high as 2 meq/g or more or may be as low as 0.1 meq/g. In the above device, the current is self-regulated in this device due to the presence of the neutral or low capacity section. The role of the spacer is to provide intimate mixing at the membrane interface and facilitate transport of ions. The spacer is also a reservoir of ion exchange capacity which is useful at high flow rates or higher concentrations of the incoming stream.

Referring to FIG. 1, one embodiment of a purifying apparatus is schematically illustrated with a no capacity zone comprising the entire purifying flow channel. The purifier generally designated by the number 10 includes a housing 12, not shown, and a cation exchange membrane 14 with exchangeable cations and having inner and outer walls 14a and 14b, respectively, spaced from an anion exchange membrane 16 with exchangeable anions and having an inner wall 16a and an outer wall 16b, respectively. Inner walls 14a and 16a are spaced from and generally parallel to each other and define therebetween purifying flow channel 18. Membranes 14 and 16 prevent bulk liquid flow but pass ions of the same charge as the corresponding exchangeable ions.

Purifier 10 also includes a cation chamber 20 on the outer wall side 14b of membrane 14 and an anion exchange chamber 22 on the outer wall side 16b of membrane 16. Flow-through cation exchange medium 24 is disposed within chamber 20 and flow-through anion exchange medium 28 is disposed in chamber 22. A cathode 30 and an anode 32 are spaced apart and in electrical communication with flow channels 20 and 22, respectively. In operation, the cathode and anode are connected to a power supply, not shown, for passing a direct current therebetween and through anion exchange medium 24, membrane 14, purifying flow channel 18, membrane 16 and anion exchange medium 28. As illustrated, cathode 30 and anode 32 are disposed parallel to membranes 14 and 16 and outside medium 24 and 28, respectively. Cathode 30 and outer wall 14b define flow channel 20 while anode 32 and outer wall 16b define flow channel 22. As illustrated, the water to be purified including ionic contaminants flows from a source, not shown, flows in the direction of arrow 32 through purifying flow channel 18 and out the outlet of purifier 10. Water from one or more sources, not shown, preferably flows in the direction of arrows 34 and 36 countercurrent to the water to be purified flowing in the direction of arrow 32 through flow channels 20 and 22 to sweep away the base and acid, respectively, formed in the flow channels from the contaminant ions.

The structure (e.g., the membranes and general configurations) of purifier 10 may be of the general type described for a suppressor of the type disclosed in U.S. Pat. Nos. 4,999,098 and 5,352,360, the entire contents of which is incorporated herein by this reference. As illustrated, the membranes may be flat or another configuration such as concentric tubes. One significant difference is that membranes 14 and 16 are of opposite charge while in the patent the parallel membranes of the sandwich suppressor embodiments are of the same charge. This illustrates the different function of a suppressor from the device of FIG. 1. Specifically, in the present invention, when an electrical potential is passed between cathode 30 and anode 32, the cation contaminants, e.g., sodium, pass across cation membrane 14 and are drawn to cathode 30 while anion contaminants are drawn across anion exchange membrane 16 towards anode 32. In this way, the cation and anion impurities are removed from the water stream in purifying flow channel 18.

In the present invention, flow-through ion exchange media 24 and 28 are disposed in channels 20 and 22 while maintaining a zone within and coextensive with the length of purifying flow channel 18 either substantially free of flow-through anion exchange medium or having flow-through ion exchange medium with low ion exchange capacity compared to media 24 and 28, i.e., no greater than 25% of media 24 and 28, preferably less than 1%. Ion exchange media 24 and 28 may have exchangeable ions (1) predominantly in the same ion exchange form as the membrane, (2) predominantly in the opposite charge, or (3) which are a mixture of exchangeable anions or cations, as will be described below. In each of these configurations, the apparatus is current efficient because of the low or non-existent ion exchange capacity of flow-through medium in the purifying flow channel.

As illustrated in FIG. 1, there is no flow-through medium in the purifying flow channel 18, ion exchange or otherwise, and so the zone comprises the entire purifying flow channel. However, there is an advantage in placing a neutral flow-through material in flow channel 18 such as a screen (e.g., one made of polyethylene or polypropylene) such as illustrated in the '098 or '360 U.S. patents. One advantage of the screen is that it serves as spacer to maintain flexible membranes 14 and 16 apart are in a generally parallel configuration. Other advantages include increased mixing of the water stream which facilitates transport of contaminant ions to the membrane thus improving the exchange kinetics and improved removal of contaminant ions. Alternatively, neutral particles may be packed in a flow-through bed in channel 18, or a flow-through porous monolith may be used.

One form of flow-through anion exchange media 24 and 28 comprises ion exchange screens which provide a continuous convoluted flow-through pathway disposed along substantially the entire length of the membrane and serves as spacers as described above. This creates turbulence and thus increases the efficiency of mixing and transfer anions from membranes 14 and 16 toward cathode 30 and anode 32, respectively. An advantage of ion exchange screens is that they bridge the distance between the membranes and corresponding electrode and are easy to maintain in place as described in the '098 or '360 U.S. patents. The device electrical resistance and wattage is lowered due to the presence of ion exchange screens as a conductive bridge between the membranes and the electrodes. The presence of ion exchange media 24 and 28 allows for even transport of current in the presence of electrolytic gases. The absence of ion exchange media will result in variance in the current due to the presence of electrolytic gases and thus result in poor deionization of the water stream.

Such screens and suitable techniques to functionalize the screens into ion exchange form are well known and disclosed in such patents. If desired, other forms of flow-through ion exchange medium or packing may be employed. For example, ion exchange particles may be packed into channels 20 and 22 including structure to keep the ion exchange particles in the device, e.g., by using a porous polymer supports at each end with smaller pores than the ion exchange resin particles being used, such as described in the '098 or '360 U.S. patents. Alternatively, a monolith of ion exchange material with flow-through pores may also be employed.

In one embodiment, flow-through ion exchange media 24 and 28 have exchangeable ions of the same polarity as the adjacent membranes 14 and 16, respectively. As illustrated, cation exchange medium 24 would be predominantly (e.g., at least 30%) in the cation form while anion exchange medium 28 would be predominantly (e.g., at least 30%) in the anion exchange form. Suitable capacities for the ion exchange medium are from 0.2 to 2 meq/g. As set forth above, in a preferred embodiment, there is no flow-through ion exchange capacity in the purifying flow channel.

Typical operating conditions are as follows. The device would be preferably powered under constant voltage conditions. The typical minimal operational voltage is dependent on the device dimensions. For a purifying channel in combination with an anion or cation channel, the preferred operable voltage range is from 2 V to 24 V or more. The current will self adjust depending on the level of contaminants. Application of constant current is not practical for the embodiment with the purifying channel being free of flow-through ion exchange medium, since prior knowledge of the contaminant level is needed. The embodiment where the purifying channel has some capacity would allow application of constant current. However the current applied has to exceed the required current for deionizing a given stream. Higher currents result in higher heat and gas formation and hence constant voltage is the most preferred means of operation.

The device of the present invention when used for chromagraphic applications will operate preferably in the flow range of 0 to 3 ml/min or 0 to 0.18 LPH and more preferably from 0 to 2 ml/min or 0 to 0.12 LPH. For laboratory applications the device of the present invention will preferably operate from 0.1 LPH to 20 LPH. The device may be operated continuously or may be used on demand.

In the use of the above system, a constant voltage power source may be employed so that cations such as sodium are drawn towards the cathode while the anions such as chloride are drawn towards the anode. The result is the migration of ions in the electric field to purify the DI water stream which exits from the bottom of the purifying flow channel 18. The device would draw only the current required to deionize the aqueous water stream. This is because there is no substantial other current carrying species such as flow-through ion exchange medium in the purifying flow channel. Thus, substantially all of the currents carried by the contaminant ions pass through the respective membranes.

By use of the same polarity for the anion exchange medium and adjacent membrane, the removed ions are trapped before they reach the corresponding electrode and the acid and base is formed in the respective flow channels. For example, referring to the cations exchange membrane 14 and cation exchange material 24, with sodium as the contaminant, the sodium ion is transported across membrane 14 by electromigration towards cathode 30. Similarly, referring to the anion exchange membrane 16 and anion exchange material 28, with chloride as the contaminant, the chloride ion is transported across membrane 16 by electromigration towards anode 32. The reactions (other than side reactions) can be described as follows, for each sodium transported to the cathode one chloride ion is transported to the anode thus completing the electrical circuit. The sodium (or other cation) transported to the cathode reacts with a hydroxide ion (generated from the electrolytic water splitting reaction at the cathode) thus forming sodium hydroxide (cation hydroxide) at the cathode, similarly at the same time the chloride (or other anion) transported to the anode picks up a hydroxide ion (generated from the electrolytic water splitting reaction at the anode) thus forming hydrochloric acid (anion acid) at the anode. For each sodium (or cation) reacting at the electrode one sodium or cation enters the cation exchange material 24. Similarly, for each chloride (or anion) reacting at the anode one chloride or anion enters the anion exchange material 28.

At the Cathode $$2H_2O + 2e^- \rightarrow 2OH^- + H_2$$

At the Anode $$H_2O \rightarrow 2H^+ + 1/2O_2 + 2e^-$$

In another embodiment, the polarity of ion exchange media 24 and 28 is reversed. Here, anion exchange medium 24 has exchangeable ions predominantly in the anion exchange form. Similarly, anion exchange medium 28 has exchangeable ions of opposite polarity to membrane 16, i.e., in the cation exchange form. In this configuration, the contaminant ions are converted to the base and acid forms at the interface between the membrane (14b or 16b) and the ion exchange medium (24 or 28). Since the removed ions are unretained in the electrode chambers (or in ion exchange medium 24 or 28), the device equilibrates faster in this configuration. The current is solely carried by the contaminate ions.

For example, referring to the cation exchange membrane 14 and anion exchange material 24, with sodium as the contaminant, the sodium ion is transported across membrane 14 by electromigration towards cathode 30. Similarly, referring to the anion exchange membrane 16 and cation exchange material 28, with chloride as the contaminant, the chloride ion is transported across membrane 16 by electromigration towards anode 32. The reactions (other than side reactions) can be described as follows, for each sodium transported towards the cathode, one chloride ion is transported towards the anode thus completing the electrical circuit. The electrolytic water splitting reaction generates hydroxide ions at the cathode and hydronium ions at the anode. The anion exchange material 24 allows transport of the electrolytically generated hydroxide up to the surface of the membrane 14b. At the interface between 14b and 24 the removed sodium (cation) reacts with the hydroxide ion forming the sodium hydroxide (cation hydroxide). Similarly the cation exchange material 28 allows transport of the electrolytically generated hydronium ions up to the surface of the membrane 16b. At the interface between 16b and 28 the removed chloride (anion) reacts with the hydronium ion forming hydrochloric acid (anion acid). For each sodium (or cation) reacting at the interface one sodium or cation enters the cation exchange membrane 14 and one hydroxide ion enters the anion exchange medium 24. Similarly for each chloride (or anion) reacting at the interface one chloride or anion enters the anion exchange membrane 16 and one hydronium enters the cation exchange medium 28.

At the Cathode $$2H_2O + 2e^- \rightarrow 2OH^- + H_2$$

At the Anode $$H_2O \rightarrow 2H^+ + 1/2O_2 + 2e^-$$

In yet another embodiment, anion exchange medium 24 and 28 may comprise media with a mixture of exchangeable cations and anions. If screens are employed, the screens may have both cation and anion exchange capacity or functionality. Alternatively, one screen of each type may be employed. For packed bed anion exchange medium, packing would be a mixture of anions, cation exchange particles. The advantage of this form of anion exchange medium is as follows. The electrolytically generated ions (hydronium and hydroxide) have a pathway for transport, while the removed contaminant ions are electromigrating to the electrodes in channel 20 and 22. In the previous discussed embodiments, either the removed contaminant ions migrate or the electrolytic ions migrate in the channel 20 and 22 and not both. Thus the formation of acid and base can occur not only at the interface but at any portion where the ion is in the vicinity of the electrolytically generated hydronium or hydroxide ions. Thus it is anticipated that the device of this embodiment will have lower resistance and will operate more efficiently for the function of deionization.

The current required to deionize a given concentration of contaminant with 100% faradaic efficiency can be calculated from $$I = FCV/60$$

Where I is current mA
F is Faraday's constant (coulombs/equiv)
C is the concentration of the contaminant in M
V is the flow rate in ml/min The current required to deionize a stream containing 2 mM of NaCL with 100% faradaic efficiency can be calculated as approximately 3.2 mA.

In the configuration of FIG. 1, if a neutral screen is used in the dilution or purifying channel, then bulk of the current is carried by the ionic contaminants in the stream and the device shows near 100% faradaic current efficiency. In the case where the neutral screen is replaced by a low capacity (e.g., less than 25% of the outer flow channels), lightly functionalized screen with anion and cation exchange capacity bulk of the current is still transported by the contaminants with a small percentage of the current being wasted in formation of water due to transport of excess $H^+$ or $OH^-$ across the screen.

Typical current efficiencies according to the present invention can range from 80 to 100%, preferably to as high as 95% or more.

In operation, the purifier of FIG. 1 may be used to purify a water stream by removing contaminants therefrom by the following method. A water stream including ionic contaminants flows through purifying flow channel 18 defined by cation exchange membrane 14 with exchangeable cations disposed on one side of the purifying flow channel and anion exchange membrane 16 with exchangeable anions disposed on the other side of the purifying flow channel. Typically, the water stream is not a strong acid or base. The membranes prevent bulk liquid flow but pass ions of the same charge as the corresponding exchangeable ions. An aqueous stream, typically tap water, not an acid or base, flows through anion exchange medium 24 and 28 on the opposite side of the respective membranes from the purifying flow channel. An electrical potential is applied between cathode 30 and anode 32 in electrical communication with the respective flow channels. The purifying flow channel is free of flow-through anion exchange medium or has flow-through anion exchange medium with an ion exchange capacity no greater than 5% of the outside flow exchange medium. The cation impurities pass from channel 18 through membrane 14 towards cathode 30 into ion exchange medium 24. The foregoing reactions occur in anion exchange medium 24 depending on the charge of the medium. Typically, the cations, such as sodium, are converted into a base, such as sodium hydroxide, and flow out of the system in a water stream flowing through channel 20 to concentrate the ions in that stream, preferably countercurrent to the water being purified. Simultaneously, the anions are drawn across anion exchange membrane 16 toward anode 32, and the foregoing reactions occur. Typically, the anions, such as chloride, are converted to acid form, such as HCl, for a flow out of the system in the water flowing through flow channel 22, preferably in countercurrent direction to the water flowing through the purifying flow channel 18.

A system, not shown, can be built with multiple side-by-side flow channels of the type described above. In this instance, a single power source can still be employed so long as the anode and cathode communicate with the outermost ion exchange medium-containing flow channels which receive the contaminant ions. For example, alternating membranes in the configuration of U.S. Pat. No. 2,794,777 may be employed with alternating anion and cation exchange membranes of the type described herein. The water stream to be purified flows through the purifying flow channel which include a zone with no substantial ion exchange medium in parallel streams through alternate flow channels flanked by the ion-receiving channels. The flow channels flanking each purifying flow channel include ion exchange medium as described above. When the voltage is applied, the contaminants flow across the membranes with exchangeable ions of opposite polarity into the flanking flow channels as described herein. In this manner, two or more parallel streams of water may be purified in purifying flow channels using a single power source. In an alternate embodiment, not shown, multiple devices of FIG. 1 can be used.

The purified ionized water may be supplied online to any analytical system requiring highly purified DI water such as a ion chromatography system or an auto sampler. For example, for a chromatography system, the purified DI water may be mixed with a developing reagent or electrolyte to form an eluent which carries the sample through a chromatography column.

FIGS. 2–6 illustrate different embodiments of purified water delivery systems according to the invention. Like parts in these embodiments will be designated with like numerals.

In one embodiment of the present invention shown in FIG. 2, purifier 10 is configured to supply purified DI water online to an ion chromatography (IC) system, generally indicated by numeral 40. In this embodiment, a 3-way tee junction or liquid stream splitter 42, in combination with suitable backpressure restrictor tubing 44 and 46, split the purified water stream from water purifier 10 into two streams. The first stream is diverted through a first conduit such as tube 46 into a chromatographic system reservoir 48 which, in turn, is fluidly connected to an IC pump 50, as shown in FIG. 2. The volume of reservoir 48 is suitably 1 to 4 liters (e.g., the volume of an ion chromatography system reservoir sold by Dionex Corporation). One should appreciate, however, that the first stream can be provided directly to IC pump 50 within the scope of the present invention. The second stream is diverted back through a second conduit such as tube 44 into the water purifier unit 10 to remove the contaminants and to provide water for the electrolytic water splitting reaction. For the purpose of the present invention, the term "conduit" refers not only to a pipe or a tube, but generally to a channel through which a fluid is conveyed, for example, a fluidic pathway. The preferred flow ratio for the two streams may range from approximately 1:1 to 1:10 with the majority of the flow going to IC reservoir 48. In this embodiment, the water stream that is fed into the anion or cation channels (or electrode channels) 20 and 22 of electrodeionizer 10 is a purified stream.

A pressurized source reservoir 52 provides impure water to purifier 10. Preferably, a gas pressure or a pump is provided to dispense the water that needs to be purified from source reservoir 52 to purifier 10 and IC system 40. The preferred pressure to the reservoir for chromatographic applications is dependent on the backpressure of the purifier and the restrictors. The pressure rating of chromatographic reservoir 48 is generally in the range of 5 psi to 30 psi.

In operation and use, pressurized source reservoir 52 provides an incoming impure water stream at a pressure "P"

which flows through the electrodeionizer 10 and then flows into IC reservoir 48 until the IC reservoir pressure is "P". After this condition is met and/or the container is fill, the excess flow is diverted into the anion and cation chambers 20 and 22 of purifyng apparatus 10. This setup can be operated continuously without any issues with flow to chromatography system 40 or contaminants being diverted to chromatography reservoir 48. When chromatographic pump 50 starts pumping water from IC reservoir 48, the pressure within IC reservoir 48 drops and when it is less than "P", the incoming water stream from source reservoir 52 again starts filling IC reservoir 48. In this configuration, the IC reservoir is continuously filled and/or DI water is provided to the IC pump 50. This method of continuous filling is accomplished without the use of any flow or level sensors.

In the embodiment shown in FIG. 3, a gas pressure source 54 provides a constant pressure "Q" to chromatography reservoir 48. In this embodiment, a gas line 56 operably connects gas pressure source 54 to IC reservoir 48 and preferably includes a check valve 58 to prevent back flow of the water into gas line 56. As the gas pressure "Q" is less than "P", IC reservoir 48 fills until the pressure in the reservoir reaches "P". While IC pump 50 is on, the IC reservoir pressure is maintained at a pressure ranging from "Q" to "P" and is automatically replenished with a fresh deionized stream from pressurized source reservoir 52 when the pressure drops below "P". This configuration provides a self- sustaining source of DI water to the IC system 40 which is maintained without the use of any additional sensors.

As noted above, the IC reservoir can be entirely bypassed and the purified stream of water can be directly interfaced to the IC pump. In this configuration, when IC pump 50 is operating, the pressure of IC pump will always less than "P" and a stream of water is continuously fed through water purifier 10 and into IC pump 50. While IC pump 50 is operating, the excess flow of the stream, if any, is diverted into the anion and cation channels 22 and 20 of purifier 10. When IC pump 50 is stopped, the line pressure, including that through tubing 46, reaches "P" and the entire flow of the stream is diverted into the anion and cation channels 22 and 20 of purifier 10. This excess flow into the anion and cation channels has no negative impact on the performance of the deionizer and the purifying device remains regenerated at all times.

In another embodiment shown in FIG. 4, the incoming water stream that needs to be purified is pumped from a process stream, for example, a reverse osmosis (RO) stream 60 instead of from a reservoir. The pressure range for the RO stream is typically between approximately 30 and 60 psi. One should appreciate that other pressures can be used.

In another embodiment shown in FIG. 5, the 3-way tee junction 42 is provided on the front end of deionizer 10. Tee junction 42, in combination with suitable backpressure restrictor tubing 44, 46, and 62, splits the purified water stream from RO supply stream 60 into two streams. The first stream is diverted through a conduit such as tube 62 into purifying flow channel 18 of water purifier 10 which, in turn, is fluidly connected to chromatographic system reservoir 48 and an IC pump 50. The second stream is diverted through a second conduit such as tube 44 into the cation and anion chambers 20 and 22 of water purifier unit 10 to remove the contaminants and to provide water for the electrolytic water splitting reaction described with respect to FIG. 1. In this embodiment, the electrode channels, that is, anion or cation channels 20 and 22 of electrodeionizer 10 are fed a stream of unpurified water having contaminant ions.

The above configurations for supplying purified water can be used with conventional water purifiers in accordance with the present invention. The above configurations may also be used to interface other types of water purifiers directly to analytical systems. For example, the embodiment shown in FIG. 6 includes a 3-way tee 42 which, in combination with suitable restriction tubing 46 and 64, diverts excess purified water for recycling. In particular, 3-way tee 42 diverts excess purified water from purifier 10 into an RO source stream 60 that is to be purified. Diversion pump 66 is provided to convey the excess water back to RO source stream. Alternatively, the diverted excess water may be conveyed back to a source reservoir, for example reservoir 52, an exhaust port, a waste port, or other suitable receptacle or passageway. One should appreciate that diversion pump 66 need not be provided if the diverted excess water is conveyed to a receptacle or passageway that has a lower pressure than the source stream.

Advantages of the devices of the present invention include the following. It can be operated electrolytically continuously without the need for chemical regenerants and includes no down time. It draws only the current required for deionization when operated under constant voltage conditions. It is unaffected by changing flow rates and can be operated using a single voltage setting in that the current self-adjust to the incoming concentration of contaminants. Thus, no user intervention is required. It can be operated as an online purifier for chromatographic applications.

Further details of the invention are illustrated in the following non-limiting examples.

EXAMPLE 1

The screens and membranes were radiation grafted materials and were manufactured along with the gaskets following the descriptions in U.S. Pat. Nos. 4,999,098 and 5,352,360. Commercially available ASRS suppressor hardware from Dionex Corporation was used as is. The format of assembling followed what is shown in FIG. 1 schematically. The device was powered directly using a Hewlett Packard DC power supply E3611A, at 12 V.

EXAMPLE 2

A DX500 ion chromatography system was used for this testing and house DI water from a commercially available point of use system was pumped from a reservoir at a flow rate of 1 ml/min through a deionizer device of the present invention (Example 1/FIG. 1) and routed to a conductivity cell. The flow out of the conductivity cell was rerouted back to the electrode chambers in the device. The device was powered using a Hewlett Packard DC power supply E3611A, under constant voltage setting of 12 V. The power to the device was turned manually ON while the conductivity was monitored. The result showed the conductivity value to decrease instantly on applying power suggesting formation of purified water. The conductivity value dropped from roughly 0.7 uS/cm to 0.06 uS/cm indicating excellent quality of the purified water. The above demonstrates that the device of the present invention is capable of purifying laboratory deionized water on demand.

EXAMPLE 3

A DX500 instrument from Dionex Corporation was used in this study. The analytical column used for this work was a 4×250-mm AS9HC column with 9 mM $Na_2CO_3$ eluent at 1 ml/min. An ASRS suppressor was used at a constant current setting of 50 mA. In this example, an ion chromatographic anion analysis of tap water, tap water purified by the current efficient electrodeionizer of this invention and a sample from a Millipore laboratory system were compared. The various samples were injected into a 25 uL injection loop. The water purification was done using the device of Example 1 with the setup of FIG. 2 except the purified product was pressurized into the sample injection loop from the reservoir of the IC system. The results indicated that the device of the present invention produced water with very little ionic contaminants as evident from no peaks in the test chromatogram as shown in FIG. 7. The tap water showed the expected components. Millipore water also showed no major peaks except one peak, which is hypothesized as a weak acid.

EXAMPLE 4

Chromatographic runs were done using a DX500 system and using an AS9HC analytical column from Dionex Corporation and by proportioning various waters such as the reverse osmosis (RO) water spiked with tap water, RO water, Millipore water and water purified by the electrodeionizer of the present invention with a carbonate eluent concentrate in a ratio of 4:1 to make an 9 mM $Na_2CO_3$ eluent. The electrodeionizer was similar to that described in FIG. 1 and Example 1. The experimental setup in this case was similar to FIG. 2. A mixture of 5 anions were injected into the system and analyzed. The results, as shown in FIG. 8, showed the RO spiked with tap water to show the highest background of roughly 45 uS/cm due to the high ionic level from the contaminants and showed excessive noise and anomalous shifts in baseline as seen at the end of the run. The RO water also showed a higher background of 26.2 uS/cm. The Millipore water gave a background of about 24.3 uS/cm while the DI water purifier gave the lowest background value of 23.9 uS/cm. The presence of ionic contaminants alters the background and varying background will impact the analyte response. The RO water and RO spiked with tap water showed significant retention time changes possibly from having a lower pH value. These results suggest that it is important to remove these contaminants for IC analysis.

EXAMPLE 5

A DX500 ion chromatography system was used for anion analysis. The analytical column was an AS11 column 4×250 mm, which was operated with the following gradient (05–38.25 mM).

| E1 | DI water | Flow = 2 ml/min | | |
|---|---|---|---|---|
| E2 | 5.0 mM NaOH | | | |
| E3 | 100 mM NaOH | | | |
| Time | E1 | | E2 | E3 |
| 0 min | 90 | | 10 | 0 |
| 2 min | 90 | | 10 | 0 |
| 5 min | 0 | | 100 | 0 |
| 15 min | 0 | | 65 | 35 |

The suppressor was an ASRS ultra suppressor that was operated at an applied current of 100 mA in the normal recycle mode. This example shows a comparison of the chromatographic performance using RO spiked with tap water before and after purification. An electrodeionizer of the type described in FIG. 2 was used in this analysis and was powered at 12 V under constant voltage conditions. The experimental setup was similar to FIG. 2 and the reservoir E1 was the reservoir for the purified product and for the before purification water. The reservoir was washed well after the before purification experiment. In this example, we used a low eluent strength at the beginning of the gradient and this condition will test for presence of contaminants. The chromatogram obtained without purification showed huge response values for chloride and sulfate at a full-scale conductivity response of 350 uS/cm as shown in FIG. 9. The response from the contaminants overwhelmed the chromatogram and the expected analyte response for a 5-anion sample test mixture is not observed. Analysis done under these conditions is not valid. Purification of the water allowed recovery of the analyte response, with a full-scale response of 35 uS/cm. The electrodeionizer of the present invention works well in reducing contaminant levels from water.

EXAMPLE 6

A DX500 ion chromatography system was used for cation analysis. The analytical column was a CS12A column 4×250 mm. The eluent was prepared by proportioning a 100-mM MSA stock concentrate with RO spiked with tap water, before and after purification. A CSRS ultra suppressor was used at a current setting of 100 mA. In this experiment, we are comparing performance of the water before and after purification for chromatography. The electrodeionizer was the same device shown in FIG. 1 and the setup was similar to FIG. 2. The results indicated higher background using the RO spiked with tap water as shown in FIG. 10. Additionally, the peak response for ammonia was much lower for the before purification water. The above can be explained as follows: the CSRS suppressor removes all anions and converts the cations to conductive bases. The background from the residual cation is basic and ammonia under basic conditions is a gas and tends to out-gas. Hence, the device showed a lower response for ammonia. The purified water on the other hand showed no such effect.

EXAMPLE 7

In this example, the anion analysis of RO spiked with tap water was done before and after purification. A Millipore purified water (RO followed by a POU polisher MilliQPlus system) was also analyzed using the same conditions. The experimental setup was similar to FIG. 2 except a 500-uL injection loop was used in this analysis. The results as shown in FIG. 11 indicated excellent contaminant removal efficiency using the device of the present invention. Tap water showed high level of ionic contaminants. A Millipore purified water showed comparable performance to the device of the present invention.

EXAMPLE 8

In this example, the cation analysis of RO spiked with tap water was done before and after purification. A Millipore purified water (RO followed by a POU polisher MilliQPlus system) was also analyzed using the same conditions. A DX500 ion chromatography system was used for cation analysis. The analytical column was a CS12A column 4×250 mm and the eluent was 20 mM MSA at 1 ml/min. A CSRS ultra suppressor was used at a current setting of 58 mA. A 500-uL-injection loop was used for injecting the samples. The results as shown in FIG. 12 indicated excellent contaminant removal efficiency using the device of the present invention. Tap water showed high level of ionic contaminants.

What is claimed is:

1. Purifying apparatus for removing charged contaminants from a water stream, comprising:

(a) a first cation exchange membrane with exchangeable cations and a first anion exchange membrane with exchangeable anions both having inner and outer walls, the inner walls of said first cation and anion membranes defining a first purifying flow channel therebetween, said first cation and anion exchange membranes preventing bulk liquid flow but passing ions of the same charge as the corresponding exchangeable ions, (b) a first cation chamber defining a first cation flow channel on the outer wall side of said first cation exchange membrane, (c) a first anion chamber defining a first anion flow channel on the outer wall side of said first anion exchange membrane, (d) a cathode and an anode in electrical communication with said first cation flow channel and said first anion flow channel, respectively, (e) flow-through first ion exchange medium disposed in said first cation flow channel, (f) flow-through second ion exchange medium disposed in said first anion flow channel, and (g) a zone within and coextensive with the length of said first purifying flow channel free of flow-through ion exchange medium or having flow-through ion exchange medium with an ion exchange capacity no greater than 25% of said first and second ion exchange media.

2. The purifying apparatus of claim 1 in which said first ion exchange medium is predominantly in the cation exchange form.

3. The purifying apparatus of claim 1 in which said first ion exchange medium is predominantly in the anion exchange form.

4. The purifying apparatus of claim 1 in which said second ion exchange medium is predominantly in the anion exchange form.

5. The purifying apparatus of claim 1 in which said second ion exchange media is predominantly in the cation exchange form.

6. The purifying apparatus of claim 1 in which said zone is substantially free of flow-through ion exchange medium.

7. The purifyng apparatus of claim 1 in which said first purifying channel is substantially free of flow-through ion exchange medium.

8. The purifying apparatus of claim 1 in which said first ion exchange medium comprises an ion exchange screen.

9. The purifying apparatus of claim 1 in which said second ion exchange medium comprises an ion exchange screen.

10. The purifying apparatus of claim 1 in which said first and second ion exchange media comprise media having a mixture of exchangeable cations and anions.

11. The purifying apparatus of claim 1 including second cation and anion exchange membranes defining a second purifying flow channel therebetween, second cation or anion flow chambers defining second cation or anion flow channels, respectively, flow-through second ion exchange resin disposed in said second cation or anion flow channels, a zone within and coextensive with the length of said second purifying flow channel being free of flow-through ion exchange medium having an ion exchange capacity greater than 25% of said first and second ion exchange media.

12. A method for purifying a water stream by removing charged contaminants therefrom, said method comprising the steps of:

(a) flowing said water stream through a purifying flow channel defined by a cation exchange membrane with exchangeable cations disposed along one side of said purifying flow channel and an anion exchange membrane with exchangeable anions disposed along the other side of said purifying flow channel, said anion and cation exchange membranes preventing bulk liquid flow but passing ions of the same charge as the corresponding exchangeable ions, a zone within and coextensive with the length of said purifying flow channel free of flow-through ion exchange medium or having flow-through ion exchange medium with an ion exchange capacity no greater than 25% of said first and second ion exchange media, (b) flowing an aqueous stream through first ion exchange medium in a cation flow channel on the opposite side of said cation exchange membrane from said purifying flow channel, (c) flowing an aqueous stream through second ion exchange medium in an anion flow channel on the opposite side of said anion exchange membrane from said purifying flow channel, and (d) during steps (a), (b) and (c), applying an electrical potential between a cathode in electrical communication with said cation flow channel and an anode in electrical communication with said anion flow channel.

13. The method of claim 12 in which said first ion exchange medium is predominantly in the cation exchange form.

14. The method of claim 12 in which said first ion exchange medium is predominantly in the anion exchange form.

15. The method of claim 12 in which said second ion exchange medium is predominantly in the anion exchange form.

16. The method of claim 12 in which said second ion exchange media is predominantly in the cation exchange form.

17. The method of claim 12 in which said purifying channel is substantially free of flow-through ion exchange medium.

18. The method of claim 12 in which said first ion exchange medium comprises an ion exchange screen.

19. The method of claim 12 in which said second ion exchange medium comprises an ion exchange screen.

20. The method of claim 12 in which said first and second ion exchange media comprise media having a mixture of exchangeable cations and anions.

21. The method of claim 12 in which steps (a)–(d) are performed in at least second parallel purifying, cation or anion flow channels.

22. The method of claim 12 in which said zone is substantially free of flow-through ion exchange medium.

23. Apparatus for purifying an aqueous liquid stream for flowing the same to an analytical system, said apparatus comprising:

(a) a flow-through water purifier having an inlet and an outlet, (b) a pressurized source of impure water communicating with said purifier inlet, (c) an analytical pump, (d) a first conduit disposed between said purifier outlet and said pump, (e) a liquid stream splitter having a diversion outlet, disposed between said impure water source and said purifier inlet, or between said purifier outlet and said analytical pump, said splitter splitting the liquid stream flowing to the splitter inlet into a first and second stream, and (f) a second conduit providing fluid communication between said diversion outlet and said purifier.

24. The apparatus of claim 23 in which said splitter is disposed between said impure water source and said purifier.

25. The apparatus of claim 24 in which said purifier comprises
  (g) a first cation exchange membrane with exchangeable cations and a first anion exchange membrane with exchangeable anions, both said membranes having inner and outer walls, the inner walls of said first cation and anion membranes defining a first purifying flow channel therebetween, said first cation and anion exchange membranes preventing bulk liquid flow but passing ions of the same charge as the corresponding exchangeable ions.
  (h) a first cation chamber defining a first cation flow channel on the outer wall side of said first cation exchange membrane,
  (i) a first anion chamber defining a first anion flow channel on the outer wall side of said first anion exchange membrane,
  (j) a cathode and an anode in electrical communication with said first cation flow channel and said first anion flow channel, respectively,
  (k) flow-through first ion exchange medium disposed in said first cation flow channel,
  (l) flow-through second ion exchange medium disposed in said first anion flow channel, and
  (m) a zone within and coextensive with the length of said first purifying flow channel free of flow-through ion exchange medium or having flow-through ion exchange medium with an ion exchange capacity no greater than 25% of said first and second ion exchange media, and said second conduit providing fluid communication between said diversion outlet and said cation and anion chambers.

26. The apparatus of claim 23 further comprising
  (g) an analytical system reservoir disposed along said first conduit between said purifier outlet and said analytical pump.

27. The apparatus of claim 23 in which said splitter is disposed between said purifier outlet and said analytical pump.

28. The apparatus of claim 27 in which said second conduit provides fluid communication between said diversion outlet and said purifier inlet.

29. The apparatus of claim 27 in which said purifier comprises
  (g) a first cation exchange membrane with exchangeable cations and a first anion exchange membrane with exchangeable anions, both said membranes having inner and outer walls, the inner walls of said first cation and anion membranes defining a first purifying flow channel therebetween, said first cation and anion exchange membranes preventing bulk liquid flow but passing ions of the same charge as the corresponding exchangeable ions.
  (h) a first cation chamber defining a first cation flow channel on the outer wall side of said first cation exchange membrane,
  (i) a first anion chamber defining a first anion flow channel on the outer wall side of said first anion exchange membrane,
  (j) a cathode and an anode in electrical communication with said first cation flow channel and said first anion flow channel, respectively,
  (k) flow-through first ion exchange medium disposed in said first cation flow channel,
  (l) flow-through second ion, exchange medium disposed in said first anion flow channel, and
  (m) a zone within and coextensive with the length of said first purifying flow channel free of flow-through ion exchange medium or having flow-through ion exchange medium with an ion exchange capacity no greater than 25% of said first and second ion exchange media, said second conduit providing fluid communication between said diversion outlet and said cation and anion chambers.

30. The apparatus of claim 23 in which said analytical system is a chromatography system and said analytical pump is a chromatography pump.

31. A method for purifying an impure aqueous liquid stream and for flowing the same to an analytical system, comprising:
  (a) purifyng the impure aqueous stream by flowing the same from a pressurized source through a purifier having an inlet and an outlet,
  (b) flowing said purified aqueous stream from said purifier outlet through an analytical pump,
  (c) splitting said impure aqueous stream between said pressurized source and said purifier so that only part of said impure aqueous stream is purified in said purifier, or splitting said purified aqueous stream from said purifier outlet so that only part of said purified liquid stream flows through said analytical pump.

32. The method of claim 31 in which said purified aqueous stream flows through an analytical system reservoir prior to flowing through said analytical pump.

33. The method of claim 31 in which the purifying step (a) is performed by
  (d) flowing said impure aqueous stream through a purifyng flow channel in said purifier defined by a cation exchange membrane with exchangeable cations disposed along one side of said purifying flow channel and an anion exchange membrane with exchangeable anions disposed along the other side of said purifying flow channel, said anion and cation exchange membranes preventing bulk liquid flow but passing ions of the same charge as the corresponding exchangeable ions, a zone within and coextensive with the length of said purifying flow channel free of flow-through ion exchange medium or having flow-through ion exchange medium with an ion exchange capacity no greater than 25% of said first and second ion exchange media,
  (e) flowing an aqueous stream through first ion exchange medium in a cation flow channel on the opposite side of said cation exchange membrane from said purifying flow channel,
  (f) flowing an aqueous stream through second ion exchange medium in an anion flow channel on the opposite side of said anion exchange membrane from said purifying flow channel, and
  (g) during steps (d), (e) and (f), applying an electrical potential between a cathode in electrical communication with said cation flow channel and an anode in electrical communication with said anion flow channel.

34. The method of claim 33 in which said impure liquid stream is split prior to flow into said purifier inlet and part of said split stream flows through said cation and anion exchange channels.

35. The method of claim 33 in which said purified liquid stream is split after flow through said purifier and prior to flow through said pump and part of said split stream flows through said cation and anion exchange channels.

* * * * *